United States Patent
Davis et al.

(10) Patent No.: US 8,953,587 B2
(45) Date of Patent: Feb. 10, 2015

(54) UE BASED CSFB ENHANCEMENT

(71) Applicant: VIA Telecom, Inc., San Diego, CA (US)

(72) Inventors: Mark E. Davis, Carlsbad, CA (US); Anthony S. Lee, San Diego, CA (US)

(73) Assignee: C.W. Investment Services Ltd., Road Town (VG)

( * ) Notice: Subject to any disclaimer, the term of this patent is extended or adjusted under 35 U.S.C. 154(b) by 132 days.

(21) Appl. No.: 13/849,164

(22) Filed: Mar. 22, 2013

(65) Prior Publication Data

US 2013/0250854 A1   Sep. 26, 2013

Related U.S. Application Data

(60) Provisional application No. 61/614,165, filed on Mar. 22, 2012.

(51) Int. Cl.
*H04L 12/66* (2006.01)
*H04W 88/06* (2009.01)

(52) U.S. Cl.
CPC .................................. *H04W 88/06* (2013.01)
USPC ............ 370/354; 370/335; 370/389; 370/392

(58) Field of Classification Search
None
See application file for complete search history.

(56) References Cited

U.S. PATENT DOCUMENTS

| | | | |
|---|---|---|---|
| 6,195,571 B1 * | 2/2001 | Osuge | 340/7.58 |
| 2008/0310357 A1 * | 12/2008 | Ulupinar et al. | 370/329 |
| 2012/0258707 A1 * | 10/2012 | Mathias et al. | 455/426.1 |
| 2013/0122827 A1 * | 5/2013 | Ali et al. | 455/77 |
| 2013/0235843 A1 * | 9/2013 | Gohari et al. | 370/331 |

* cited by examiner

*Primary Examiner* — Duc C Ho
(74) *Attorney, Agent, or Firm* — Richard K. Huffman; James W. Huffman

(57) ABSTRACT

A mobile station for notification of a circuit switched event. The mobile station includes a circuit switched modem, a packetized data modem, a radio, and a tune away controller. The circuit switched communicates circuit switched data over a circuit switched network. The packetized data modem communicates packetized data over a packetized data network. The radio couples the packetized data modem to the packetized data network via a packetized data radio link, and couples the circuit switched modem to the circuit switched network via a circuit switched radio link. Only one of the links may be active at a time. The tune away controller is coupled to the circuit switched modem and to the packetized data modem, and indicates tune away events over the packetized data network so that the circuit switched event is processed by the mobile station. The tune away controller directs switching between the links.

18 Claims, 6 Drawing Sheets

TUNE AWAY DUAL MODE CELLULAR ARCHITECTURE

SINGLE RADIO DUAL MODE CELLULAR ARCHITECTURE

EXEMPLARY TUNE AWAY MESSAGE FORMAT

US 8,953,587 B2

UE BASED CSFB ENHANCEMENT

CROSS-REFERENCE TO RELATED APPLICATIONS

This application claims the benefit of the following U.S. Provisional Applications, each of which is herein incorporated by reference for all intents and purposes.

| Ser. No. | FILING DATE | TITLE |
| --- | --- | --- |
| 61614165 | Mar. 22, 2012 | UE BASED CSFB ENHANCEMENT |

BACKGROUND OF THE INVENTION

1. Field of the Invention

This invention relates in general to the field of cellular communications, and more particularly to a mechanism for performing circuit switched fallback in a single radio dual mode cellular system.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1xRTT, and high speed data communications over another type of network, say LTE, which provides exclusively for packetized data and does not provide the quality of service that users prefer to support voice communications. In the near future, these hybrid solutions will be prevalent within the art.

In order to field such a hybrid system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process and incoming or outgoing call or other circuit switched event, and more specifically, how such switching is presently affected utilizing a back end interworking solution that bridges circuit switched notifications through a packetized data "tunnel" in order to communicate these notifications to a mobile station.

In particular, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. And while effective, the present inventors have noted that special purpose hardware and programming is required as part of the overall architecture in order to provide this capability.

Accordingly, what is needed is a technique that would allow a mobile station to be notified of or to provide notification for a circuit switched event while communicating over a packetized data network, where tunneled messages and commensurate back end hardware/software is not required.

SUMMARY OF THE INVENTION

The present invention, among other applications, is directed to solving the above-noted problems and addresses other problems, disadvantages, and limitations of the prior art.

The present invention provides a superior technique for providing circuit switched fallback notifications in the absence of tunneling mechanisms. In one embodiment, a mobile station is provided for notification of a circuit switched event. The mobile station includes a circuit switched modem, a packetized data modem, a radio, and a tune away controller. The circuit switched modem is configured to communicate circuit switched data over a circuit switched network. The packetized data modem is configured to communicate packetized data over a packetized data network. The radio is configured to couple the packetized data modem to the packetized data network via a packetized data radio link, and is configured to couple the circuit switched modem to the circuit switched network via a circuit switched radio link, where only one of the links may be active at a time. The tune away controller is coupled to the circuit switched modem and to the packetized data modem, and is configured to indicate tune away events over the packetized data network so that the circuit switched event is processed by the mobile station, where the tune away controller directs switching of the radio between the links.

One aspect of the present invention contemplates a system for providing notification of a circuit switched event. The system has a mobile station and a packetized data base station. The mobile station includes a circuit switched modem, a packetized data modem, a radio, and a tune away controller.

The circuit switched modem is configured to communicate circuit switched data over a circuit switched network. The packetized data modem is configured to communicate packetized data over a packetized data network. The radio is configured to couple the packetized data modem to the packetized data network via a packetized data radio link, and is configured to couple the circuit switched modem to the circuit switched network via a circuit switched radio link, where only one of the links may be active at a time. The tune away controller is coupled to the circuit switched modem and to the packetized data modem, and is configured to indicate tune away events over the packetized data network so that the circuit switched event is processed by the mobile station, where the tune away controller directs switching of the radio between the links. The packetized data base station is coupled to the mobile station via the packetized data radio link, and is configured to allow the mobile station to tune away from the packetized data network in order to execute the tune away events.

Another aspect of the present invention comprehends a method for providing notification of a circuit switched event in a mobile station. The method includes first communicating circuit switched data over a circuit switched network; second communicating packetized data over a packetized data network; first coupling a circuit switched modem to the circuit switched network via a circuit switched radio link, and second coupling a packetized data modem to the packetized data network via a packetized data radio link, where only one of the links may be active at a time; and indicating tune away events over the packetized data network so that the circuit switched event is processed by the mobile station, where the tune away controller directs switching of the radio between the links.

BRIEF DESCRIPTION OF THE DRAWINGS

These and other objects, features, and advantages of the present invention will become better understood with regard to the following description, and accompanying drawings where.

DETAILED DESCRIPTION

Figure 1:
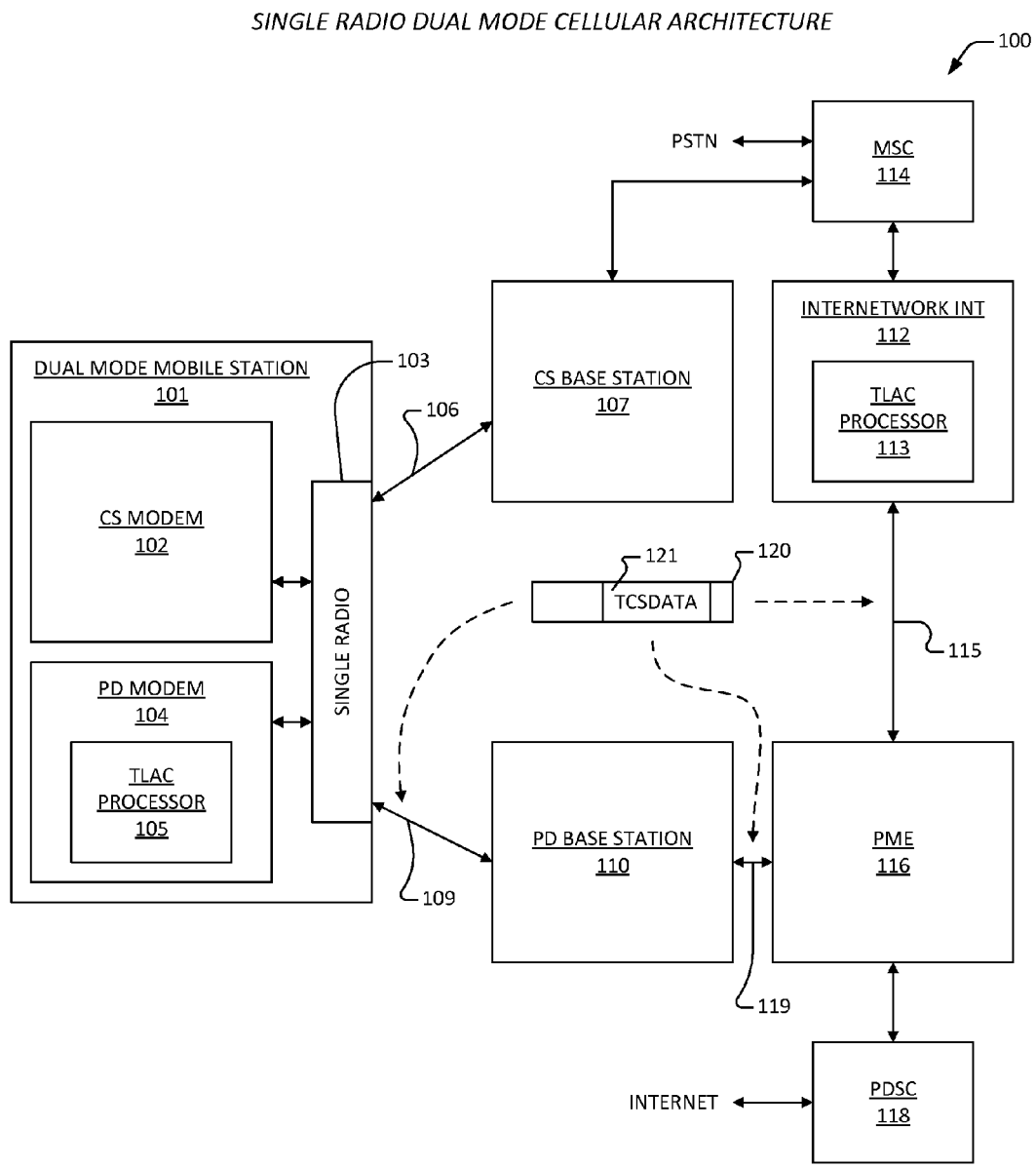
FIG. 1 is a block diagram illustrating a present day single radio dual mode cellular architecture.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In view of the above background discussion on CDMA2000 inter radio access interworking and associated techniques employed within a corresponding system to provide for signaling transactions for 1xRTT circuit switched notifications to/from a mobile station, a discussion of the limitations associated with present day mechanisms will be presented within reference to FIG. 1. Following this, a discussion of the present invention will be presented with reference to FIGS. 2-5. The present invention overcomes the limitations of present day tunneling mechanisms by providing a technique for signaling 1xRTT circuit notifications using a tune away process in a mobile station that does not require use of a tunnel and commensurate back end equipment.

Consider FIG. 1, where a block diagram is presented illustrating a present day single radio dual mode cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The modems 102, 104 are baseband modems 102, 104 and share a single radio 103 for transmission of signals over either the packetized data radio link 109 or a circuit switched radio link 106. The mobile station 101 is thus coupled to a circuit switched base station 107 via the circuit switched radio link 106 and to a packetized data base station 110 over the packetized data radio link 109.

The circuit switched base station 107 is coupled to a mobile switching center 114. The mobile switching center 114 is coupled to an internetworking interface 112. The internetworking interface 112 is coupled to a packetized management entity PME 116 via a packetized data link 115. The mobile switching center 114 routes calls and events to/from a public switched telephone network (PSTN). The PME 116 is coupled to a packetized data switching center 118, which routes data and events to/from a packetized data network such as the Internet.

In operation, circuit switched calls and events over the PSTN are routed by the mobile switching center 114 to the circuit switched base station 107. All control and traffic associated with the calls or other events occurs over the circuit switched radio link 106 are processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occur over the packetized data radio link 109 and are received by the radio 103 and processed by the packetized data modem 104 within the mobile station 101.

Of particular interest to the present application are scenarios and circumstances associated with certain present day dual mode configurations, one example of which is a single radio dual mode mobile station 101 that is capable of processing circuit switched calls and other events over a code demand multiple access (CDMA) radio link 106 such as might be found in a CDMA2000 1xRTT architecture, and that processes packetized data and other events over a packetized data radio link 109 such as might be found in a Evolved Universal Mobile Telecommunications System Terrestrial Radio Access Network (EUTRAN) architecture. The EUTRAN architecture is more commonly known as the Long Term Evolution (LTE) architecture and will henceforth be referred to as such in this application. As one skilled in the art will appreciate, the CDMA2000 1xRTT circuit switched architecture (or "1x" architecture) is well known in the art for processing circuit switched calls (i.e., voice calls), and the LTE architecture is well known and is presently being fielded in major metropolitan centers around the world as an improvement in packetized data communications capabilities over the currently fielded EV-DO packetized data network. Additionally, well known to those in the art is that LTE is a network that consists exclusively of packetized data. That is, LTE does not support circuit switched channels such as those used to provide for conventional cellular voice calls. LTE does provide support for so-called voice-over-internet protocol (VoIP) calls, but as one skilled in the art will appreciate, the disadvantages associated with present day VoIP techniques (e.g., jitter) make general use of VoIP in a mobile station 101 highly unlikely.

Going forward in the present application, examples and terminology will be employed from both 1x and LTE applications because these are well appreciated and prevalently fielded technologies that can be effectively employed to teach present day limitations and how the present invention is utilized to overcome these limitations. However, the present inventors note that the scope of the present invention is not to be limited to 1x and LTE, but rather extended to comprehend single radio dual mode cellular architectures where one of the radio links 109 employed is presently utilized to notify the mobile station 101 of an incoming voice call or other event that is associated with a circuit switched link 106 having timing and quality of service properties and requirements unique to circuit switched applications.

In specific 1x and LTE terminologies, the mobile station 101 may be referred to as the user equipment (UE) 101. The packetized data mobility entity 116 is referred to as a mobility management entity (MME) 116, which is the primary access node for an LTE network. The MME 116 interfaces to many packetized data base stations 110, which are known as enhanced node Bs (eNBs) 110. The internetworking interface 112 is known as the S102 interface 112, or more commonly as the interworking solution (IWS) 112. The interworking solution 112 is responsible for interfacing a circuit switched network such as 1x to the LTE network via a tunneling mechanism. The packetized data radio link 109 is referred to as the LTE-Uu interface 109. Hence, when packetized data is being transmitted over the packetized data network to the mobile station 101, for purposes of the present application, the circuit switched elements 102, 107, 112 shown in the architecture 100 are effectively idle and the radio 103 is employed to communicate over the packetized data link 109. Packetized data is routed to/from the Internet via the packetized data switching center 118, through the packetized data mobility entity 116, through the packetized data base station 110, and over the packetized data radio link 109 to/from the packetized data modem 104 within the mobile station 101.

But when a circuit switched event (e.g., a call) comes into the mobile switching center 114 that is targeted for the mobile station 101, the mobile station 101 must be notified—over the packetized data radio link 109—that it must, in a timely fashion, cease processing packetized data, and fall back to a circuit switched radio link 106 in order to proceed further, that is, to accept the call. Yet, because circuit switched and packetized data protocols are not equivalent, designers are working to provide techniques and mechanisms that allow for this notification to take place. One such mechanism that is employed in the 1x/LTE environment is the aforementioned tunneling, whereby tunneled circuit switched data (TCS-DATA) 121 provides for notification, acknowledgement, and negotiation of circuit switched parameters associated with acceptance of a call and fallback to the circuit switched radio link 106 is encapsulated as the data portion within lower level data packets 120 that are transmitted/received over the packetized data network, which includes links 115, 119, and 109. Hence, as the name implies, circuit switched notification data 121 employs a data packet 120 as a tunnel through which circuit switched parameters are transmitted/received.

This "tunneling" protocol is defined in *E-UTRAN—cdma2000 1x Connectivity and Interworking Air Interface Specification*, Version 2.0, April 2011, C.S0097-0, published by the 3$^{rd}$ Generation Partnership Project 2 (3GPP2) (hereinafter, "the '0097 Specification). The protocol that prescribes the circuit switched fallback to 1x mechanism for a single radio mobile station 101 as of the invention date is found in *Circuit Switched (CS) Fallback in Evolved Packet System (EPS); Stage* 2, Version 10.2.1, 2013-01-04, TS 23.272 published by 3GPP2 (hereinafter, "the '272 Specification).

The internetwork interface 112 is a back end special-purpose equipment element that executes the interface between the mobile switching center 114 and the packetized data mobility entity 116, and is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1xRTT, there is a great deal of configuration information which must be processed by the endpoints of a circuit switched event in order to guarantee quality of service. In 1x, the protocol layer at with this information is processed is known as the link access control (LAC) layer. The packetized data modem 104 and packetized data base station 110 also include LAC processing elements (not shown) to support layered communications over the packetized data network. However, in order to provide for notification of circuit switched calls and other events over the packetized data network, tunneled LAC (TLAC) layer processing elements are required in both the internetwork interface 112 and the packetized data modem 104. Thus, the packetized data modem 104 includes a TLAC processor 105 and the internetwork interface 112 includes a TLAC processor 113. These processors 105, 113, among other functions that will be described below, perform the LAC layer processing that is required in the packetized data modem 104 and internetwork interface 112, respectively, to provide for notification of circuit switched calls and other events over the packetized data network. Certainly, since the primary purpose of the internetwork interface 112 is to interface the circuit switched network to the packetized data network, it follows then that processing of LAC layer information is necessary. In fact, the sole purpose of the internetwork interface 112 is to provide for tunneling of circuit switched data over the packetized data network.

As one skilled in the art will further appreciate, the hardware and software associated with tunneling information related to circuit switched calls and events over the packetized data network is limiting and cumbersome at best. Special purpose equipment (e.g., internetwork interface 112) is required to bridge the circuit switched data to the mobile station 101 over the packetized data tunnel, and thus the present inventors have observed that such equipment contributes to increased power consumption and decreased reliability of the communications system as a whole.

The present invention overcomes the above noted problems, and others, by providing a technique for transmitting and receiving circuit switched notifications in a single radio dual mode mobile station that utilizes a tune away technique rather than tunneling. The tune away mechanisms are wholly embodied in the mobile station, thus alleviating the requirement for an internetwork interface 112. The present invention will now be discussed with reference to FIGS. 2-6.

Figure 2:
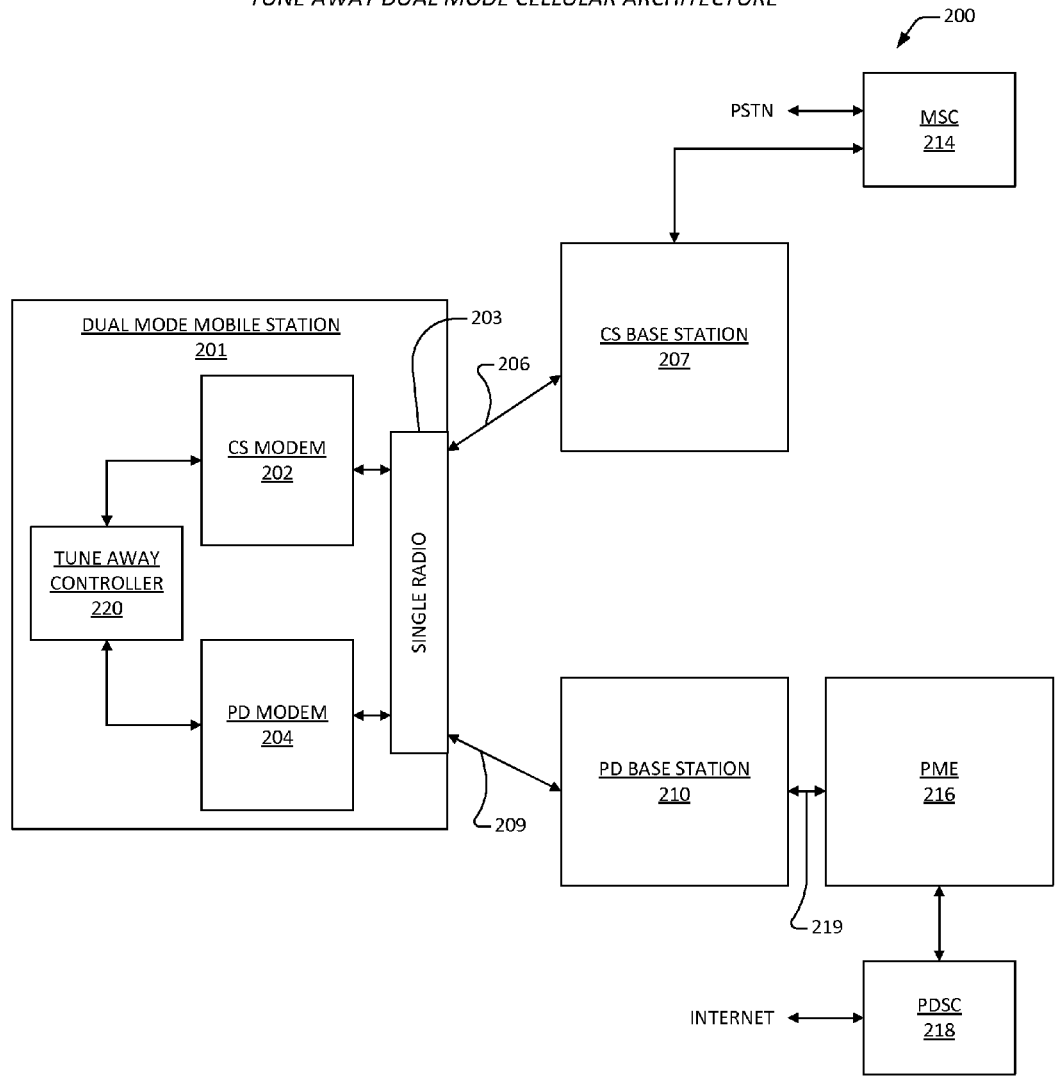
FIG. 2 is a block diagram depicting a tune away dual mode cellular architecture according to the present invention.

Turning now to FIG. 2, a is a block diagram is presented depicting a tune away dual mode cellular architecture 200 according to the present invention. Like the architecture 100 discussed above with reference to FIG. 1, the architecture 200 according to the present invention utilizes a single radio dual mode mobile station 201 for transmitting and receiving over both a packetized data radio link 209 and a circuit switched radio link 206. The single radio dual mode cellular architecture 200 is provided for notifying the dual mode mobile station 201 of an incoming call or other circuit switched event, but rather than employing the tunneling technique discussed above, the present invention utilizes a tune away technique to accomplish the same ends without a requirement for special back end equipment such as an internetwork interface 112. The architecture 200 includes the mobile station 201, which has a circuit switched modem 202 for processing circuit switched cellular applications, and a packetized data modem 204, for processing packetized data applications. The modems 202, 204 are baseband modems and share a single radio 203 for transmission of signals over either the packetized data radio link 209 or the circuit switched radio link 206. The mobile station 201 is thus coupled to a circuit switched base station 207 via the circuit switched radio link 206 and to a packetized data base station 210 over the packetized data radio link 209.

The circuit switched base station 207 is coupled to a mobile switching center 214. And in contrast to the architecture 100 of FIG. 1, there present invention does not require an internetworking interface 112. The mobile switching center 214 routes calls and events to/from a public switched telephone network (PSTN). For transmission and reception of packetized data, a packetized management entity (PME) 216 is coupled to a packetized data switching center (PDSC) 118, which routes data and events to/from a packetized data network such as the Internet.

In operation, circuit switched calls and events over the PSTN are routed by the mobile switching center 214 to the circuit switched base station 207. All control and traffic associated with the calls or other events occurs over the circuit switched radio link 206 are processed by the circuit switched modem 202 within the mobile station 201. Likewise, packetized data and events over the internet are routed by the packetized data switching center 218 to a packetized data mobility entity 216 that is interfaced to the packetized base station 210 currently assigned to the mobile station 201. All control and traffic associated with the packetized data or other events occur over the packetized data radio link 209 and are received by the radio 203 and processed by the packetized data modem 204 within the mobile station 201.

One embodiment of the present invention contemplates scenarios and circumstances associated with certain present day dual mode configurations, one example of which is a single radio dual mode mobile station 201 that is capable of processing circuit switched calls and other events over a CDMA radio link such as might be found in a CDMA2000 1xRTT architecture, and that processes packetized data and other events over a packetized data radio link 209 such as might be found in a Evolved Universal Mobile Telecommunications System Terrestrial Radio Access Network (EUTRAN) (i.e., LTE) architecture. Although examples will be henceforth discussed with reference to both 1x and LTE, the present inventors note that such examples are provided to teach the present invention in the context of well known exclusive data protocols. However, the present inventors note that the scope of the present invention is not to be limited to 1x and LTE, but rather extended to comprehend single radio dual mode cellular architectures 200 where one of the radio links 209 employed is presently utilized to notify the mobile station 201 of an incoming voice call or other event that is associated with a circuit switched link 206 having timing and quality of service properties and requirements unique to circuit switched applications.

The PME 216 interfaces to many packetized data base stations 210 While packetized data is being exchanged over the packetized data radio link 209, for purposes of the present application, the circuit switched elements 202, 207, 214 shown in the architecture 200 are effectively idle and the radio 203 is employed to communicate over the packetized data link 209. Packetized data is routed to/from the Internet via the packetized data switching center 218, through the packetized data mobility entity 216, through the packetized data base station 210, and over the packetized data radio link 209 to/from the baseband packetized data modem 204 within the mobile station 201.

But in contrast to present day architectures 100, when a circuit switched notification is required such as, but not limited to, registration, mobile call origination (i.e., the mobile station 201 places a call), or mobile call termination (i.e., the mobile station 201 receives a call), the mobile station 201 according to the present invention tunes away from activity over the packetized data radio link 209 and performs the required circuit switched operations over the circuit switched radio link 206, as will be described in further detail below.

In one embodiment, a tune away message is transmitted to the packetized data base station 210 in order to time synchronize absence of the mobile station 201 from participation in activity over the packetized data radio link 209. Another embodiment synchronizes tune away events to coincide with 1x power saving sleep and wake times for the mobile device

201. The mobile station 201 thus includes a tune away controller 220 that is configured to synchronize timebases between the packetized data network and the circuit switched network, to perform tune away events via the baseband circuit switched modem 202 and the baseband packetized data modem 204, and to format and process tune away request messages and responses.

Figure 3:
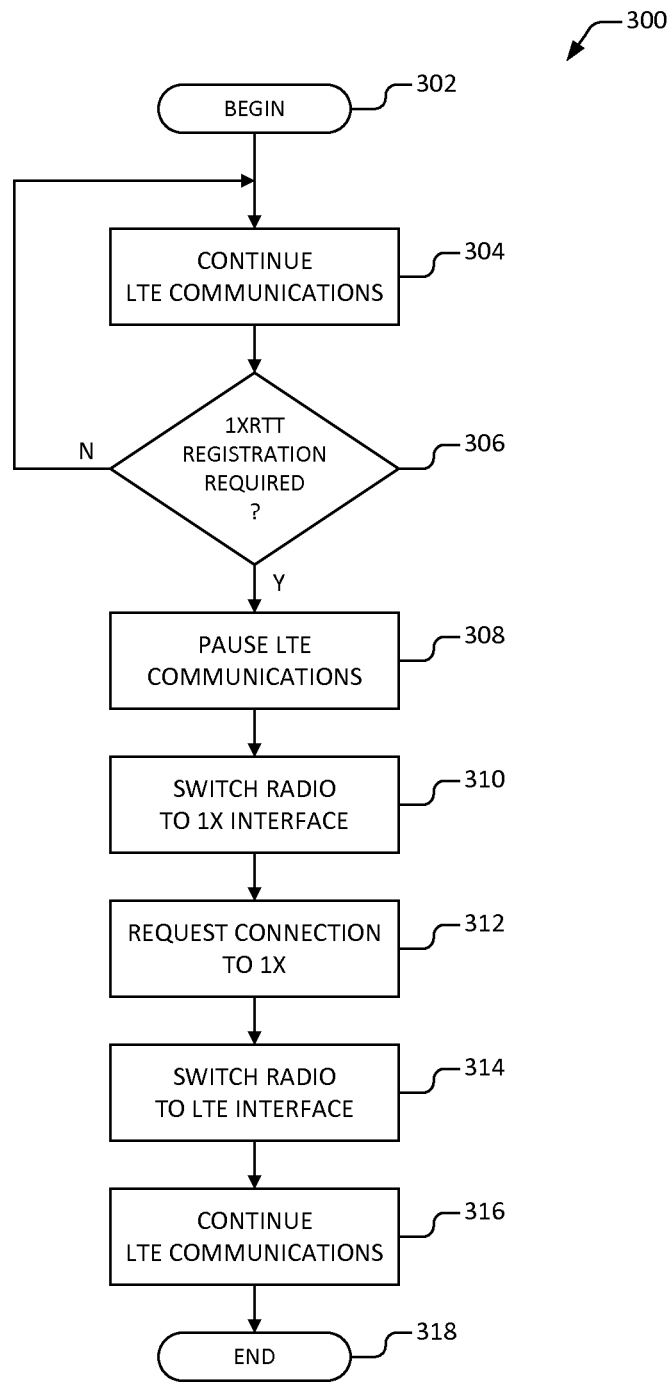
FIG. 3 is a flow chart featuring a tune away registration method according to the present invention, such as might be employed by the architecture of FIG. 2.

Referring to FIG. 3, a flow chart 300 is presented featuring a tune away registration method according to the present invention, such as might be employed by the architecture of FIG. 2. Flow begins at block 302 where a mobile station according to the present invention is enjoying reception and transmission of packetized data over a packetized data link such as LTE. Flow then proceeds to block 304.

At block 304, LTE communications is continued. The mobile station's radio is tuned to the packetized data radio link and the circuit switched modem is idle. Flow then proceeds to decision block 306.

At decision block 306, an evaluation is made by the tune away controller to determine if a 1xRTT registration is required. If not, then flow proceeds to block 304, where LTE communications are continued. If so, then flow proceeds to block 308.

At block 308, LTE communications are paused. In one embodiment, the tune away controller transmits a tune away message to the packetized data base station indicating a synchronized tune away time and duration. In another embodiment, the same message is sent requesting, and tune away event and a grant message are received from the base station. Flow then proceeds to block 310.

At block 310, the mobile station switches its radio to the 1x air interface. Flow then proceeds to block 312.

At block 312, the mobile station requests connection to the 1x infrastructure. Flow then proceeds to block 314.

At block 314, in conjunction with the requested tune away time, the tune away controller in the mobile station directs the packetized data modem to switch the radio back to the LTE interface. Flow then proceeds to block 316.

At block 316, the mobile station continues LTE communications. Flow then proceeds to block 318.

At block 318, the method completes.

Figure 4:
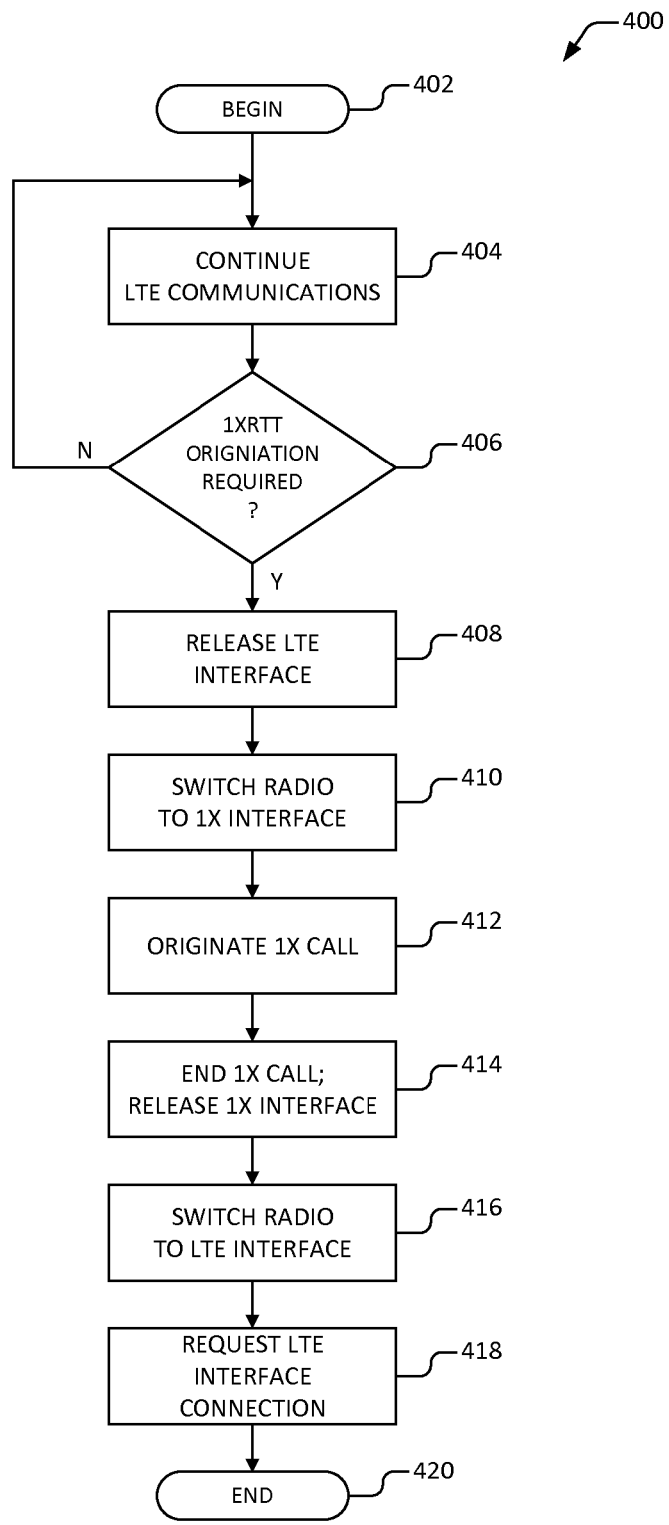
FIG. 4 is a flow chart featuring a tune away mobile origination method according to the present invention, such as might be employed by the architecture of FIG. 2.

Now referring to FIG. 4, a flow chart 400 is presented featuring a tune away mobile origination method according to the present invention, such as might be employed by the architecture of FIG. 2. Flow begins at block 402, where a mobile station according to the present invention is enjoying reception and transmission of packetized data over a packetized data link such as LTE. Flow then proceeds to block 404.

At block 404, LTE communications is continued. The mobile station's radio is tuned to the packetized data radio link and the circuit switched modem is idle. Flow then proceeds to decision block 406.

At decision block 406, an evaluation is made by the tune away controller to determine if a 1xRTT mobile origination is required. If not, then flow proceeds to block 404, where LTE communications are continued. If so, then flow proceeds to block 408.

At block 408, LTE communications ceased and the connection to the LTE interface is released. Flow then proceeds to block 410.

At block 410, the mobile station switches its radio to the 1x air interface. Flow then proceeds to block 412.

At block 412, the mobile station originates a call over the 1x network and thus implicitly registers with the 1x infrastructure. Flow then proceeds to block 414.

At block 414, the mobile station ends the 1x call and releases the 1x interface. Flow then proceeds to block 416

At block 416, the tune away controller in the mobile station directs the packetized data modem to switch the radio back to the LTE interface. Flow then proceeds to block 418.

At block 418, the mobile station requests connection to the LTE interface in order to provide for LTE communications. Flow then proceeds to block 420.

At block 420, the method completes.

Figure 5:
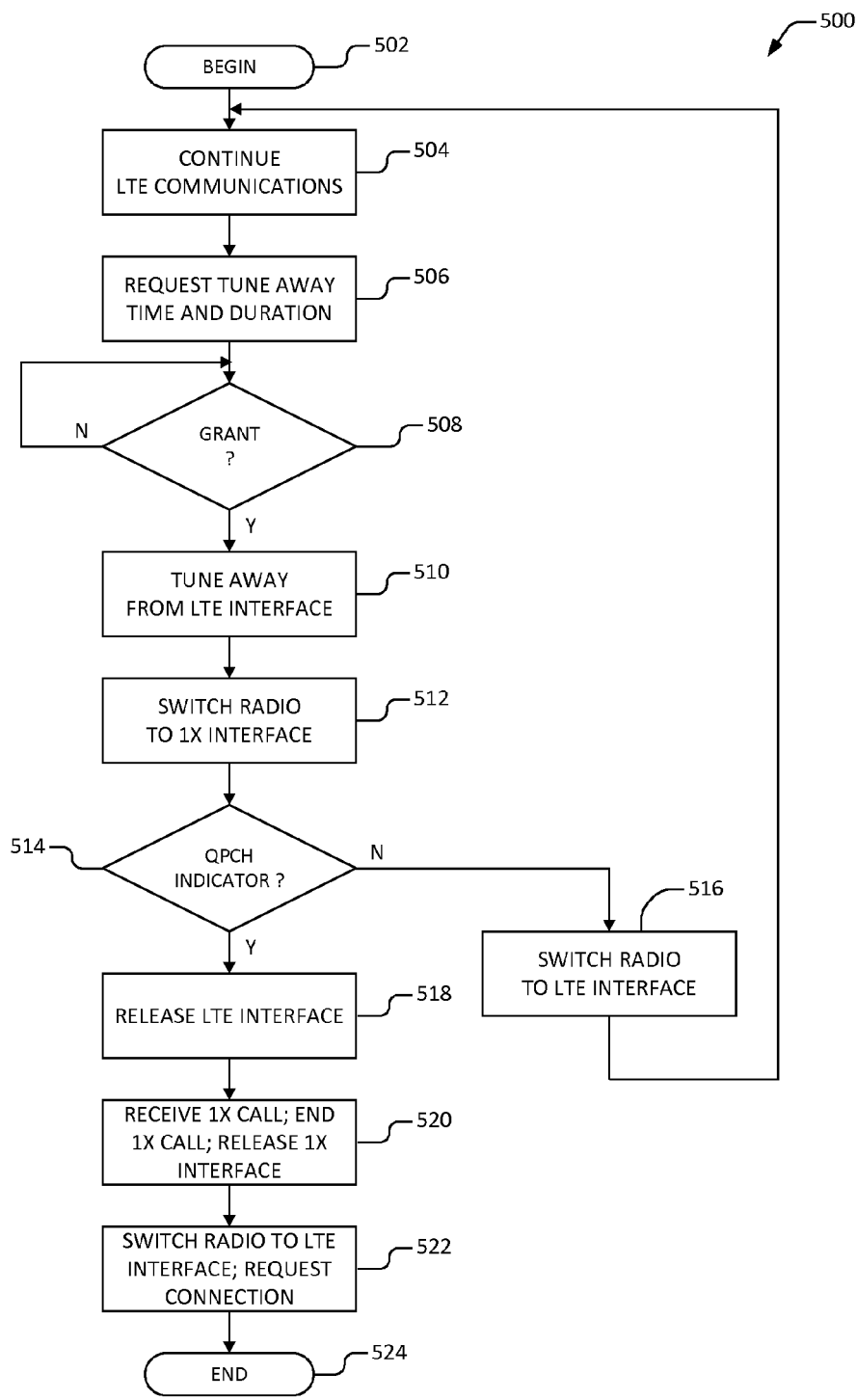
FIG. 5 is a flow chart featuring a tune away mobile termination method according to the present invention, such as might be employed by the architecture of FIG. 2.

Turning to FIG. 5, a flow chart 500 is presented featuring a tune away mobile termination method according to the present invention, such as might be employed by the architecture of FIG. 2. Flow begins at block 502, where a mobile station according to the present invention is enjoying reception and transmission of packetized data over a packetized data link such as LTE. Flow then proceeds to block 504.

At block 504, LTE communications is continued. The mobile station's radio is tuned to the packetized data radio link and the circuit switched modem is idle. Flow then proceeds to decision block 506.

At decision block 506, in synchronization with circuit switched sleep and wake up times as is understood by those in the art, the tune away controller requests a tune away time and duration to the LTE network via transmission of a tune away message. Flow then proceeds to decision block 508.

At decision block 508, the tune away controller determines whether a grant has been received from the LTE network in order to tune away for the requested time and duration. If not, then flow proceeds to decision block 508. If so, then flow proceeds to block 510.

At block 510, the tune away controller directs the mobile station to tune away from the LTE interface. Flow then proceeds to block 512

At block 512, the mobile station switches its radio to the 1x air interface. Flow then proceeds to decision block 514.

At decision block 514, the mobile station scans its quick paging channel (QPCH) for a quick paging indicator. If the indicator is not present, then flow proceeds to block 516. If the indicator is present, indicating that a call is pending for reception, then flow proceeds to block 518.

At block 516, the tune away controller directs the mobile station to switch its radio back to the LTE interface. Flow then proceeds to block 504.

At block 518, the mobile station releases the LTE interface. Flow then proceeds to block 520.

At block 520, the mobile station receives the call and subsequently ends the call. The mobile station then releases the 1x interface. Flow then proceeds to block 522.

At block 522, the tune away controller in the mobile station directs the packetized data modem to switch the radio back to the LTE interface and then request connection to the LTE network. Flow then proceeds to block 524.

At block 524, the method completes.

It is noted that FIGS. 3-5 discuss mobile registration, mobile origination, and mobile termination, respectively, in accordance with tune away mechanisms for circuit switched fallback according to the present invention. Thus, FIG. 6 is provided to teach an exemplary tune away message that may be employed to indicate or request a tune away event.

Figure 6:
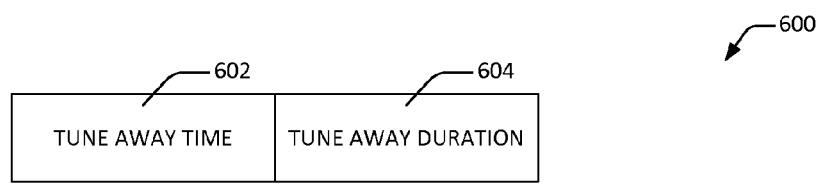
FIG. 6 is an exemplary tune away message format according to the present invention.

Turning to FIG. 6, an exemplary tune away message format 600 according to the present invention is presented. The message 600 has a tune away time field 602 and a tune away duration field 604. Operationally, the tune away controller in a mobile station according to the present invention is employed to synchronize the timebase for the circuit switched network according to the timebase for the packetized data network, and the fields 602, 604 are configured to indicate a time for tune away and a duration in accordance with the packetized data network timebase.

It should be borne in mind that all of the above and similar terms are to be associated with appropriate physical quantities and are merely convenient labels applied to these quantities. Unless specifically stated otherwise, or as is apparent from the discussion, terms such as "processing," "computing," "calculating," "determining," "displaying," or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An mobile station for providing notification of a circuit switched event, the mobile station comprising:
   a circuit switched modem, configured to communicate circuit switched data over a circuit switched network;
   a packetized data modem, configured to communicate packetized data over a packetized data network;
   a radio, configured to couple the packetized data modem to the packetized data network via a packetized data radio link, and configured to couple the circuit switched modem to the circuit switched network via a circuit switched radio link, wherein only one of said links may be active at a time; and
   a tune away controller, coupled to said circuit switched modem and to said packetized data modem, configured to indicate tune away events over said packetized data network so that the circuit switched event is processed by the mobile station, wherein said tune away controller directs switching of said radio between said links.

2. The mobile station as recited in claim 1, wherein said circuit switched modem and said radio are compatible with CDMA2000 1xRTT protocol, and wherein said packetized data modem and said radio are compatible with LTE protocol.

3. The mobile station as recited in claim 1, wherein the circuit switched event comprises at least one of the following events:
   a mobile registration event;
   a mobile origination event; and
   a mobile termination event.

4. The mobile station as recited in claim 1, wherein the circuit switched event is over a CDMA2000 1xRTT network.

5. The mobile station as recited in claim 1, wherein said tune away controller indicates said tune away events via transmission of a tune away message over said packetized data network.

6. The mobile station as recited in claim 1, wherein said tune away controller is configured to synchronize timebases between the packetized data network and the circuit switched network.

7. An system for providing notification of a circuit switched event, the system comprising:
   a mobile station, comprising:
      a circuit switched modem, configured to communicate circuit switched data over a circuit switched network;
      a packetized data modem, configured to communicate packetized data over a packetized data network;
      a radio, configured to couple the packetized data modem to the packetized data network via a packetized data radio link, and configured to couple the circuit switched modem to the circuit switched network via a circuit switched radio link, wherein only one of said links may be active at a time; and
      a tune away controller, coupled to said circuit switched modem and to said packetized data modem, configured to indicate tune away events over said packetized data network so that the circuit switched event is processed by the mobile station, wherein said tune away controller directs switching of said radio between said links; and
   a packetized data base station, coupled to the mobile station via said packetized data radio link, configured to allow said mobile station to tune away from said packetized data network in order to execute said tune away events.

8. The system as recited in claim 7, wherein said circuit switched modem and said radio are compatible with CDMA2000 1xRTT protocol, and said radio are compatible with LTE protocol.

9. The system as recited in claim 7, wherein the circuit switched event comprises at least one of the following events:
   mobile registration event;
   mobile origination event; and
   mobile termination event.

10. The system as recited in claim 7, wherein the circuit switched event is over a CDMA2000 1xRTT network.

11. The system as recited in claim 7, wherein said tune away controller indicates said tune away events via transmission of a tune away message over said packetized data network.

12. The system as recited in claim 7, wherein said tune away controller is configured to synchronize timebase between the packetized data network and the circuit switched network.

13. A method for providing notification of a circuit switched event in a mobile station, the method comprising:
   first communicating circuit switched data over a circuit switched network;
   second communicating packetized data over a packetized data network;
   first coupling a circuit switched modem to the circuit switched network via a circuit switched radio link, and second coupling a packetized data modem to the packetized data network via a packetized data radio link, wherein only one of the links may be active at a time; and
   indicating tune away events over the packetized data network so that the circuit switched event is processed by the mobile station, wherein the tune away controller directs switching of the radio between the links.

14. The method as recited in claim 13, wherein the circuit switched modem and is compatible with CDMA2000 1xRTT protocol, and the packetized data modem is compatible with LTE protocol.

15. The method as recited in claim 13, wherein the circuit switched event comprises at least one of the following events:
- mobile registration event;
- mobile origination event; and
- mobile termination event.

16. The method as recited in claim 13, wherein the circuit switched event is over a CDMA2000 1xRTT network.

17. The method as recited in claim 13, wherein said indicating indicates the tune away events via transmission of a tune away message over the packetized data network.

18. The method as recited in claim 13, wherein said tune away controller is configured to synchronize timebase between the packetized data network and the circuit switched network.

* * * * *